Feb. 2, 1971     B. L. PETERSEN     3,559,494
ARRANGEMENT FOR OBTAINING AN ABSOLUTE SEAL IN BEARINGS WHICH
INCLUDE ANGULAR OSCILLATING MOVEMENTS
Filed March 7, 1969
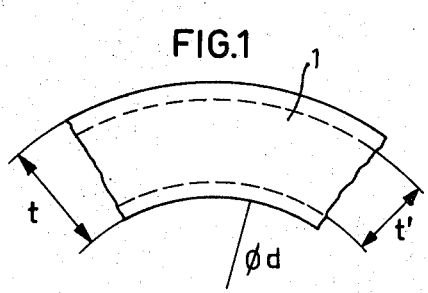
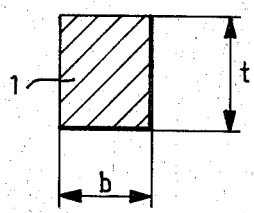
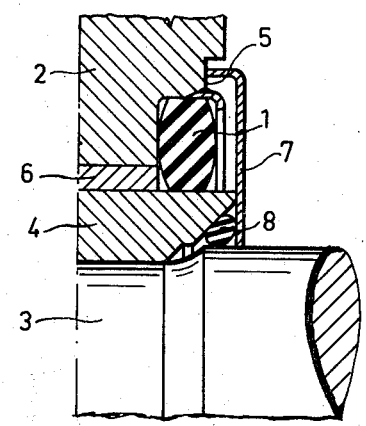
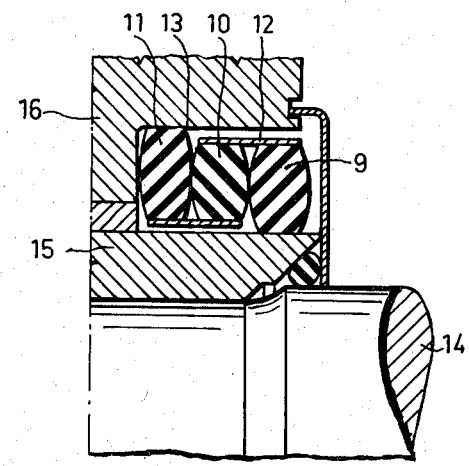
INVENTOR.
Bjarne Louis Petersen
BY
Prince, Schiffler & Parker
Attorneys United States Patent Office 3,559,494
Patented Feb. 2, 1971

3,559,494
ARRANGEMENT FOR OBTAINING AN ABSOLUTE SEAL IN BEARINGS WHICH INCLUDE ANGULAR OSCILLATING MOVEMENTS
Bjarne Louis Petersen, Ronnvagen, Jarna, Sweden, assignor to Aktiebolaget Scania-Vabis, Sodertalje, Sweden, a corporation of Sweden
Filed Mar. 7, 1969, Ser. No. 805,316
Claims priority, application Sweden, Mar. 11, 1968, 3,175/68
Int. Cl. F16j 15/50
U.S. Cl. 74—18           1 Claim

ABSTRACT OF THE DISCLOSURE

An arrangement for obtaining an absolute seal between an axle or axle unit and an inner cylindrical surface in a bore disposed in a bearing housing or the like coaxial with the axle, the axle or the like and the cylindrical surface being permitted to perform a limited relative angular oscillating movement. A resilient seal ring made of rubber or similar material which has a low modulus of elasticity is so secured under subjection to radial compression forces between said members that said ring as a result of its pretensioned state is held in rotationally stationary abutment with respective abutment surfaces in bearing housing and on the axle unit. The seal ring, upon a predetermined limited relative angular movement of either member, will then completely take up said angular movement with a stretch.

---

The present invention is concerned with bearings including angular oscillating movements, and relates to a means for obtaining an absolute seal between an axle or axle unit and an inner cylindrical surface of a bore disposed in a bearing housing or the like coaxial with the axle. Such seals are used to seal pivot shafts for bogey vehicles.

It is known to use for sealing purposes sealing rings made of elastomeric material and presenting an external portion which acts against an inner cylindrical surface in a bore disposed in the bearing housing coaxial with the shaft, and a lip portion active against the axle or shaft, the sealing function of the device being very highly dependent upon a bellows-like construction of the portion thereof bridging the external portion and lip portion. It is also known in this type of sealing ring to embed V-shaped stiffeners made of steel plate or the like in the outer portion thereof, the intention being that when mounting the seal the stiffeners are compressed axially to cause the outer diameter of the sealing ring to be enlarged. However, the inner diameter of the ring must remain the same when compressing the stiffeners, and to facilitate abutment of the lip portion against the axle there is normally employed a suitably pre-tensioned closed, annular coil tension spring or the like.

Seal rings of this category are only suitable for bearings lubricated with grease, and as a result of poor or insufficient sealing it is necessary to lubricate the bearing regularly during operation, at closely spaced intervals. In spite of this it has been found necessary in certain instances to fit the bearing with special bearing bushings which require less lubrication than normal bearing surfaces.

Also known are resilient sealing rings provided with special, rigid thrust rings on either side thereof, whereupon when the seal is fixed in a bearing block or the like the rings are drawn together by means of screws to change the diameter of the sealing ring and force said ring against respective contact surfaces in the bearing block and on the shaft.

Such a seal ring requires a relatively large amount of room at disposal for its assembly, and furthermore, similarly to other known seals, is thought to be based on the assumption that an axle or the like shall rotate relative to the corresponding abutment surfaces of the sealing ring and, in other words, be adapted for rotary shafts or the like.

The object of the present invention is to provide in bearings which perform oscillating movements a seal which enables simple and inexpensive construction of the bearing and which eliminates leakage of oil or other lubricant enclosed therewithin.

Absolute sealing between an axle or an axle unit and an inner cylindrical surface in a bore disposed in a bearing housing coaxial with the axle is mainly characterized according to the invention in that a sealing ring made of rubber or similar material having a low modulus of elasticity is so attached between the aforesaid members, whilst in a radially compressed state, that the sealing ring as a result of its pre-tension, is held firmly against rotation in contact with respective abutment surfaces in the bearing housing and on the axle unit, and that upon relative rotary movement of either member the sealing ring completely takes up the rotary motion with an inner torsional stretch.

When using a sealing ring designed and mounted in accordance with the invention between an axle and a bearing housing, the latter can be filled with oil, whereby the otherwise necessary special bearings as a result thereof can be replaced with less expensive bronze bearings. The sealing ring arrangement of the present invention requires no inspection and it has been shown to increase the operative lifetime of the bearing quite considerably. In the case of a sealing ring pre-tensioned in accordance with the invention, the surface friction is sufficient to maintain the sealing ring in the desired effective contact with the abutment surfaces, although if desired the sealing ring can be bonded to the respective surfaces with an adhesive or the like.

Maximum rotary movement for a sealing ring is restricted to approximately ±15°. If greater rotary movements are required sealing in accordance with the invention can be obtained by assembling three or more sealing rings in axial adjacent relationship and indirectly connecting said rings via two or more intermediate sleeves to a common seal unit, wherein one outer seal ring is held stationary against rotation against one axle unit and the other outer sealing ring is held stationary against rotation against an abutment surface in a bearing housing.

The invention will now be described in detail with reference to the accompanying drawing, wherein FIGS. 1 and 2 show with a sector shaped section in plan view and cross section respectively the dimension designations of a seal ring prior to mounting said ring in a bearing, FIG. 3 shows in axial cross section how a sealing ring according to the invention is mounted in a bearing, and FIG. 4 shows in the same manner an alternative embodiment for obtaining absolute sealing in a bearing subjected to high angular oscillatory movement.

In FIGS. 1 and 2 there is shown a circular sealing ring 1 of inner diameter $d$ and of rectangular cross section, presenting a thickness $t$ and a width $b$. It should be understood, however, that the seal ring 1 of the invention is not restricted to the illustrated construction, but can be modified to alternative embodiments while retaining the given dimensions. The seal ring 1, which is made of oil resistant rubber or the like material having a low modulus of elasticity, is intended to form an absolute seal in bearings performing angular oscillatory movements, against oil or other form of lubricant enclosed therein.

To this purpose the sealing ring 1 is adapted to be compressed diametrically by means of appropriate tools when mounted in the bearing and secured in a bearing housing or the like 2, between a bearing sleeve 4 fixed on a shaft or axle 3 and an inner cylindrical surface 5 in a bore disposed in the bearing housing 2 coaxial with said shaft 3. As can be seen from FIG. 3 there is located between the axle units 3, 4 and the bearing housing 2 a bearing sleeve 6, and the entire seal is shielded from the ingress of foreign, contaminating matter by arranging in a conventional manner an external metal cover 7 and inside said cover an O-ring 8 which abuts a conical surface.

To obtain non-rotational abutment of the seal ring 1 against the axle units 3, 4 and the bearing housing 2 respectively during relative angular movement of either member between two stop members (not shown) limiting the angular movement, the ring 1 is dimensioned for the maximum value $\pm V^\circ$ of the relevant angle of limited angular movement according to the following equation:

$$\frac{t'}{t} = a_1 V + a_2$$

in which $t'$ is the thickness of the ring when secured in the bearing and $a_1$ and $a_2$ are constants having and falling within the values: $a_1 = -0.03$; and $0.9 \leq a_2 \leq 1.3$; the latter constant, however, being dependent on the following conditions of the compression factor:

$$0.5 < \frac{t'}{t} < 1.0$$

Furthermore, it is necessary that the original thickness $t$ of the sealing ring 1 fulfills the requirement that $t \leq 5d$; and that $0.01b \leq t \leq 10b$.

In the case of a sealing ring 1 constructed and secured in the bearing in accordance with the invention, relative limited angular movement between the axle units 3, 4 and the bearing housing 2 will be taken up by stretching the sealing ring 1.

The ability of the ring to stretch, and also the angle $V^\circ$ of limited angular movement, are restricted in each particular case by the type of material selected. It has been discovered, however, that by using adhesive contact surfaces greater compression factors can be selected than when relying merely on frictional securing forces.

In applications wherein the angular movement must exceed that of which the aforedescribed embodiments are capable of, sealing according to the invention can be obtained by means of the embodiment shown in FIG. 4. This embodiment includes three seal rings 9, 10, 11 placed in axial adjacent relationship and connected indirectly with two intermediate sleeves 12 and 13. The sleeve 13 engages axially partially in the sleeve 12, and the sealing ring 10 is compressively secured between said sleeves in the aforesaid manner while the outer seal rings 9 and 11 are secured in the same manner between the sleeve 12 and an axle unit 14, 15 and sleeve 13 and a bearing housing 16, respectively.

The embodiment considerably increases the ability of the seal to permit angular movement and by further increasing the number of seal rings and intermediate sleeves by two, four etc., the maximum limits of angular movement of a bearing so equipped can be varied within wide limits, said limits being defined by stop members for the member performing the angular movement.

What is claimed is:

1. In an arrangement for obtaining an absolute seal between an axle or axle unit and an inner cylindrical surface in a bore formed in a bearing housing coaxial with the axle, and wherein said axle and cylindrical surface have a limited relative angular oscillating movement of $\pm V^\circ$ therebetween, the improvement which comprises a resilient sealing ring of rubber or similar material having a low modulus of elasticity, and unstressed inner diameter $d$, a thickness $t \leq 5d$ and width $b$ falling within the limits $0.01b \leq t \leq 10b$ secured between said axle and inner cylindrical surface under subjection to radial compression stresses, the thickness of said ring in its compressed state having a value of $t'$, said ring as a result of its compressed state being held in rotationally stationary abutment with corresponding abutment surfaces on said inner cylindrical surface and axle, and said ring upon said limited relative angular movement $\pm V^\circ$ completely taking up said angular movement with a stretch, there being the following relationship between $t$, $t'$ and $V$ $$\frac{t'}{t} = a_1 V + a_2$$

wherein:

$$a_1 = -0.03 \quad 0.9 \leq a_2 \leq 1.3$$

and:

$$0.5 < \frac{t'}{t} < 1.0$$

References Cited

UNITED STATES PATENTS

| | | | |
|---|---|---|---|
| 2,911,840 | 11/1959 | Muller et al. | 74—18X |
| 2,995,041 | 8/1961 | Rowan | 74—18 |

FOREIGN PATENTS

| | | | |
|---|---|---|---|
| 583,452 | 12/1946 | England | 74—18 |

FRED C. MATTERN, JR., Primary Examiner

F. D. SHOEMAKER, Assistant Examiner